United States Patent
Takahashi et al.

(10) Patent No.: US 11,365,783 B2
(45) Date of Patent: Jun. 21, 2022

(54) TRANSVERSE SEGMENT FOR A DRIVE BELT FOR A CONTINUOUSLY VARIABLE TRANSMISSION AND A DRIVE BELT AND A CONTINUOUSLY VARIABLE TRANSMISSION PROVIDED THEREWITH

(71) Applicants: JATCO LTD, Fuji (JP); ROBERT BOSCH GMBH, Stuttgart (DE)

(72) Inventors: Yuji Takahashi, Fuji (JP); Geert Lamers, Tilburg (NL); Kouhei Toyohara, Fuji (JP); Michael Keersmaekers, Tilburg (NL); Makoto Momoi, Fuji (JP); Takeshi Kimura, Yokohama (JP)

(73) Assignees: JATCO LTD, Fuji (JP); ROBERT BOSCH GMBH, Stuttgart (DE)

( * ) Notice: Subject to any disclaimer, the term of this patent is extended or adjusted under 35 U.S.C. 154(b) by 258 days.

(21) Appl. No.: 16/614,930

(22) PCT Filed: May 17, 2018

(86) PCT No.: PCT/EP2018/025140
§ 371 (c)(1),
(2) Date: Nov. 19, 2019

(87) PCT Pub. No.: WO2018/210456
PCT Pub. Date: Nov. 22, 2018

(65) Prior Publication Data
US 2020/0103000 A1    Apr. 2, 2020

(30) Foreign Application Priority Data
May 19, 2017   (EP) .................................... 17172098

(51) Int. Cl.
*F16G 5/16*   (2006.01)
*F16H 9/12*   (2006.01)

(52) U.S. Cl.
CPC ...... *F16G 5/16* (2013.01); *F16H 9/12* (2013.01)

(58) Field of Classification Search
CPC ................. F16G 5/16; F16H 9/04; F16H 9/12
(Continued)

(56) References Cited

U.S. PATENT DOCUMENTS

| 4,080,841 A | 3/1978 | Vollers |
| 4,303,403 A * | 12/1981 | Larners ..................... F16G 5/16 |
| | | 474/201 |

(Continued)

FOREIGN PATENT DOCUMENTS

| GB | 1286777 A | 8/1972 |
| JP | 2009-204101 A1 | 9/2009 |

(Continued)

OTHER PUBLICATIONS

EP Search Report, dated December 1, 2017, from corresponding EP application No. 17172098.0.
(Continued)

*Primary Examiner* — Henry Y Liu
(74) *Attorney, Agent, or Firm* — Nixon & Vanderhye

(57) ABSTRACT

Disclosed is a transverse segment for a drive belt with a stack of rings and with a number of the transverse segments, which transverse segment includes a base part and two pillar parts that respectively extend from a respective axial side of the base part in radial outward direction, defining a central opening of the transverse segment between them, and that are each provided with a hook portion extending over a part of the central opening in the general direction of the respectively opposite pillar part. A width dimension of one of the pillar parts of the transverse segment is less than a width dimension of the respective other pillar part.

17 Claims, 3 Drawing Sheets

(58) Field of Classification Search
USPC .......................................................... 474/242
See application file for complete search history.

(56) References Cited

U.S. PATENT DOCUMENTS

| | | | | | |
|---|---|---|---|---|---|
| 4,498,892 | A | * | 2/1985 | Huntley | ................... F16G 5/163 474/201 |
| 4,645,478 | A | * | 2/1987 | Cuypers | .................... F16G 5/16 474/201 |
| 5,123,880 | A | * | 6/1992 | Sekine | ...................... F16H 9/24 474/244 |
| 6,679,798 | B1 | * | 1/2004 | Takagi | ...................... F16G 5/16 474/242 |
| 8,109,851 | B2 | * | 2/2012 | Kobayashi | ................ F16G 5/16 474/201 |
| 8,187,129 | B2 | * | 5/2012 | Kobayashi | ................ F16G 5/16 474/242 |
| 8,337,347 | B2 | * | 12/2012 | Kobayashi | ................ F16G 5/16 474/201 |
| 2007/0072721 | A1 | * | 3/2007 | Takagi | ...................... F16G 5/16 474/242 |
| 2010/0016112 | A1 | * | 1/2010 | Kobayashi | ................ F16G 5/16 474/255 |
| 2019/0346016 | A1 | * | 11/2019 | Van Treijen | .............. F16G 5/16 |

FOREIGN PATENT DOCUMENTS

| | | |
|---|---|---|
| JP | 2009-204103 A | 9/2009 |
| JP | 2011-069461 A | 4/2011 |
| WO | 2015/177372 A1 | 11/2015 |
| WO | 2015/185759 A1 | 12/2015 |

OTHER PUBLICATIONS

International Search Report and Written Opinion, dated Jun. 18, 2018, from corresponding PCT application No. PCT/EP2018/025140.

* cited by examiner

TRANSVERSE SEGMENT FOR A DRIVE BELT FOR A CONTINUOUSLY VARIABLE TRANSMISSION AND A DRIVE BELT AND A CONTINUOUSLY VARIABLE TRANSMISSION PROVIDED THEREWITH

BACKGROUND OF THE INVENTION

Field of the Invention

This disclosure relates to a transverse segment that is destined to be part of a drive belt for a continuously variable transmission with two pulleys and the drive belt. Such a drive belt is commonly known and is mainly applied running around and between the two transmission pulleys, which pulleys each define a V-groove of variable width wherein a respective circumference part of the drive belt is held.

Description of the Related Art

A known type of drive belt consists of an essentially contiguous row of transverse segments that are mounted on and around the circumference of a number of endless bands or rings that are mutually stacked in the radial direction. Each such transverse segment defines a central opening that is open towards the radial outside of the drive belt and that accommodates and confines a respective circumference section of such ring stack, while allowing the transverse segments to move along the circumference thereof. This particular type of drive belt is for example known from the British patent number GB1286777 (A) and a more recent example thereof is provided by WO2015/177372 (A1).

In the above and the below description, the axial, radial and circumference directions are defined relative to the drive belt when placed in a circular posture. A thickness dimension of the transverse segments is defined in the circumference direction of the push belt, a height dimension of the transverse segment is defined in the said radial direction and a width dimension of the transverse segment is defined in the said axial direction. A thickness dimension of the ring stack is defined in the said radial direction and a width dimension of the ring stack is defined in the said axial direction.

The known transverse segment comprises a base part and two pillar parts that extend from the base part at either, i.e. left and right axial side thereof in radial outward direction, i.e. upwards in height direction. The said central opening accommodating the ring stack is defined by and between the base part and the two pillar parts. In between the pillar parts, the said opening is bound by a radially outward facing support surface of the base part, which support surface interacts with and supports the ring stack from the radial inside thereof. At least one, but typically both of the pillar parts of the known belt are provided with a hook portion extending in axial direction over the central opening that is thereby partly closed in radial outward direction as well. A bottom, i.e. radially inner surface of such hook portion thus engages the ring stack from the radial outside thereof, whereby the latter is contained inside the central opening of the transverse segment in radial outward direction.

In order to assemble the drive belt, i.e. in order to mount the transverse segments on the ring stack, each transverse segment is first placed to an axial side of the ring stack in a relatively rotated position. Then it is moved towards the ring stack in axial direction, whereby the said axial side of the ring stack slides in between the hook portion of one of the pillar parts and the support surface, to allow the opposite axial side of the ring stack to pass the hook portion of the opposite pillar part. Thereafter, the transverse segment is rotated back into axial alignment with the ring stack and finally it is moved back a little, i.e. in the opposite axial direction, to centre it relative to the ring stack. In such final, axially centred position of the transverse segment, the hook portion or hook portions thereof show an overlap in axial direction, i.e. overhang, with the ring stack. By such overlap it is a/o prevented that the transverse segment can separate from the ring stack in radial inward direction during operation of the drive belt. In this latter respect, it is noted that the said overlap is preferably applied on both axial sides of the ring stack by providing both pillar parts with the hook portion as illustrated in GB1286777. However, such overlap is preferably larger than what is illustrated in GB1286777, in particular relative to the width of the ring stack.

A relatively large overlap can also be beneficial in reducing a contact stress between the ring stack and the hook portions during drive belt operation, by distribution a contact force over a larger surface area. However, as such overlap increases, a relative play or clearance in axial direction between the transverse segment and the ring stack typically has to increase as well, in order to allow the transverse segments to be mounted on the ring stack without having to deform, i.e. bend it. In turn, such large axial play disadvantageously increases the size of the drive belt and thus also of the transmission, at least in relation to a given power transmitting capacity thereof. Furthermore, such large axial play allows the ring stack to move away from its preferred axially centred position in the central opening of the transverse segment during operation of the drive belt, potentially to the extent that on one axial side thereof the respective hook portion does not overlap with the ring stack anymore. As a result, the transverse segment may still separate from the ring stack by a rotation thereof in radial inward direction, which would compromise the operation of the drive belt as a whole.

SUMMARY OF THE INVENTION

Against the above-described background, the present disclosure sets out to improve the known drive belt. In particular, the present disclosure aims to improve the robustness of the drive belt, preferably without detriment to the customary high performance thereof in terms of its power transmitting capacity during operation in the transmission.

According to the present disclosure, the above aim is realised by providing the drive belt with two types of transverse segments, each having an asymmetric design that is axially mirrored between the said two types. In particular, one of the two pillar parts of the transverse segment is provided with an undercut, i.e. pocket, in axial direction, merging with the central opening. In other words, the undercut or pocket is formed in the said one pillar part, opening to the central opening. Hereby, effectively, the width of the said one pillar part is locally reduced relative to the width of the opposite pillar part, at least at the radial level of the support surface. Furthermore, in a first of the said two types of transverse segment the undercut is provided in, for instance, the left-side pillar part and in a second of the said two types of transverse segments the undercut is then provided in the right-side pillar part. By the presence of the undercuts, the transverse segments can be mounted on the ring stack, by inserting the ring stack under the hook portion into the undercut. Thus, the first type of transverse segments, whereof the left-side pillar parts are provided with the undercut, are placed to the left axial side of the ring stack and are moved to the right with respect to the ring stack for mounting these. The second type of transverse segments, whereof the right-side pillar parts are provided with the undercut, are placed to the right axial side of the ring stack and are moved to the left with respect to the ring stack for mounting these. In the thus assembled drive belt, the ring stack is securely contained in the central openings of the transverse segments with a favourably small axial play in combination with a favourably large overlap between the ring stack and the hook portions.

To facilitate the insertion of the ring stack into the undercut of the transverse segment during assembly of the drive belt, the said bottom inner surface of the hook portion of the pillar part provided with the undercut can be oriented radially outwards away from the respective pillar part towards the entrance to the central opening. Preferably, such bottom surface is at least partly oriented essentially in parallel with an imaginary, i.e. virtual straight line drawn through both:

a point on the outer contour of the hook portion of the pillar part without the undercut, which point defines the axial extent of the entrance to the central opening towards that pillar part; and a further point defined by an axial side edge of the support surface on the side of the undercut.

Additionally or alternatively and to the same effect, the hook portion of the pillar part provided with the undercut can extend towards an axial middle of the transverse segment to a lesser extent than the hook portion of the opposite pillar part.

In the novel drive belt according to the present disclosure, the ring stack is contained in the axial direction by and between the respective pillar parts of the two types of transverse segments that are not provided with the undercut. Preferably, i.e. in order to distribute the forces exerted on—in particular—the ring stack during operation of the novel drive belt as equally as possible, the two transverse segment types are arranged mutually alternating in the row of transverse segments of the drive belt. Hereby, two consecutive transverse segments of the same type will be present in the drive belt only once and only if the drive belt includes an odd number of transverse segments in total.

It is noted that also a radial play between the hook portions of the transverse segments and the ring stack is an important aspect of the design of the drive belt. In particular, such radial play is preferably kept small in comparison with the thickness of the ring stack to ensure the desired, i.e. optimum performance of the drive belt. However, when such radial play is small, the width of the ring stack that can still be fitted in the central opening of the transverse segments, at least without bending it in assembly, can be only marginally larger than the axial extent, i.e. width of the entrance to the central opening that is defined by and between the hook portions in axial direction, such that the said overlap is small as well. According to a further aspect of the present disclosure, the width of the ring stack and thus the said overlap can, however, be favourably increased, in particular without also increasing the said radial play, by orienting the undercuts in the pillar parts of the transverse segments not only in axial direction, but also in radial inward direction. In this latter embodiment of the transverse segment according to the present disclosure, a radially inner, i.e. bottom surface of the undercut, forming an extension of the support surface, is oriented, at least in part, in radial inward direction away from the support surface. By the provision of such extension surface at a radially inward angle relative to the support surface, an angle of insertion of the ring stack into the central opening can be increased relative to such insertion angle allowed by a solely axially oriented undercut whereof the bottom surface extends essentially in line with the support surface. In turn, such increased insertion angle allows for a thicker ring stack to be fitted, while realising the same amount of overlap between the ring stack and the hook portions as before. Based on geometric considerations, the extension surface preferably either essentially coincides with or lies radially inward of a virtual straight line drawn through both:

a point on the outer contour of the hook portion of the pillar part without the undercut, which point defines the axial extent of the entrance to the central opening towards that pillar part; and a further point defined by an axial side edge of the support surface on the side of the extension surface of the undercut.

Preferably, a convexly curved transition surface is provided between the extension surface and the support surface, i.e. the said axial side edge thereof, for avoiding a sharp edge there between that could otherwise cause an unfavourably high contact stress between the ring stack and the transverse segment during drive belt operation. In this respect, it is noted that the support surface is typically already convexly curved, for promoting a preferred, centred alignment of the ring stack relative to the transverse segments, as described in for example the U.S. Pat. No. 4,080,841. According to the present disclosure, the radius of curvature of the support surface adjoining the transition surface is, however, much larger than—and thus clearly distinguishable from—a radius of curvature of the transition surface itself. In particular, the (local) radius of curvature of the support surface is at least 1 order of magnitude larger than that of the transition surface.

BRIEF DESCRIPTION OF THE DRAWINGS

This and other embodiments of the novel drive belt according to the present disclosure will now be explained further with reference to the drawing, in which.

DESCRIPTION OF THE PREFERRED EMBODIMENTS

Figure 1:
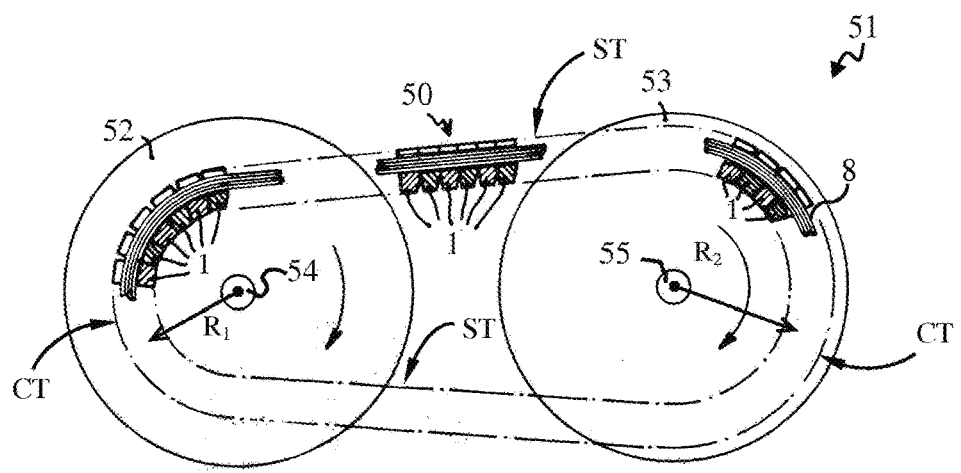
FIG. 1 is a simplified and schematic side elevation of a transmission with two pulleys and a drive belt with a ring stack and a row of transverse segments mounted along the circumference of the ring stack.

FIG. 1 schematically shows the central parts of a continuously variable transmission 51 for use in a driveline of, for example, passenger motor vehicles. This transmission 51 is well-known and comprises at least a first variable pulley 52 and a second variable pulley 53. In the driveline, the first pulley 52 is coupled to and driven by a prime mover, such as an electric motor or a combustion engine, and the second pulley 53 is typically coupled to and drives a driven wheel of the motor vehicle via a number of gears.

The transmission pulleys 52, 53 each typically comprise a first conical pulley sheave that is fixed to a pulley shaft 54, 55 of the respective pulley 52, 53 and a second conical pulley sheave that is axially displaceable relative to the respective pulley shaft 54, 55 and that is fixed thereto only in rotational direction. A drive belt 50 of the transmission 51 is wrapped around the pulleys 52, 53, while being accommodated between the pulley sheaves thereof. As appears from FIG. 1, the trajectory of the drive belt 50 in the transmission 51 includes two straight parts ST and two curved parts CT where the drive belt 50 is wrapped around a respective one of the two transmission pulleys 52, 53. The drive belt 50 is composed of a ring stack 8 and a plurality of transverse segments 1 that are mounted on the ring stack 8 along the circumference thereof in an, at least essentially, contiguous row. For the sake of simplicity, only a few of these transverse segments 1 are shown in FIG. 1. In the drive belt 50 the transverse segments 1 are movable along the circumference of the ring stack 8, which ring stack 8 is typically composed of a number of flexible metal bands or rings, which metal rings are stacked one around one another, i.e. are mutually nested. During operation of the transmission 51, the transverse segments 1 of the drive belt 50 at the first pulley 52 are driven in the direction of rotation thereof by friction. These driven transverse segments 1 push preceding transverse segments 1 along the circumference of the ring stack 8 of the drive belt 50 and, ultimately, rotationally drive the second pulley 53, again by friction. In order to generate such friction (force) between the transverse segments 1 and the transmission pulleys 52, 53, the said pulley sheaves of each pulley 52, 53 are forced towards each other, whereby these exert a pinching force on the transverse segments 1 in the axial direction thereof. To this end, electronically controllable and hydraulically acting movement means (not shown) that act on the moveable pulley sheave of each pulley 52, 53 are provided in the transmission 51. In addition to exerting a pinching force on the drive belt 50, these movement means also control respective radial positions R1 and R2 of the drive belt 50 at the pulleys 52, 53 and, hence, the speed ratio that is provided by the transmission 51 between the pulley shafts 54, 55 thereof.

Figure 2:
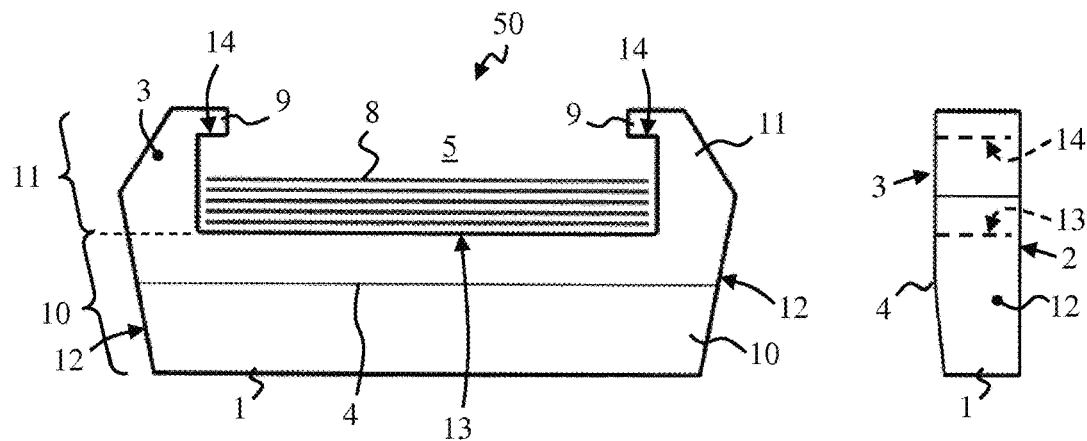
FIG. 2 provides a first example of the known drive belt in a cross-section thereof facing in its circumference direction and also includes a separate side elevation of only the transverse segment thereof.

In FIG. 2 an early known example of the drive belt 50 is schematically illustrated. On the left side of FIG. 2 the drive belt 50 is shown in cross-section and on the right side of FIG. 2 a side elevation of only the transverse segment 1 thereof is included. From FIG. 2 it appears that the transverse segments 1 are generally shaped roughly similar to the letter "V", i.e. are generally V-shaped. In other words, side faces 12 on either axial side of the transverse segment 1 that arrive in (friction) contact with the transmission pulleys 52, 53 are mutually oriented at an angle that closely matches an angle that is defined by and between the conical pulley sheaves of the transmission pulleys 52, 53. In practice, these side, i.e. pulley contact faces 12 are either corrugated by a macroscopic profile or are provided with a rough surface structure (not shown), such that only the higher lying peaks of the corrugation profile or of the surface roughness arrive in contact with the transmission pulleys 52, 53. This particular feature of the design of the transverse segment 1 provides that the friction between the drive belt 50 and the transmission pulleys 52, 53 is optimised by allowing cooling oil that is applied in the known transmission 51 to be accommodated in the lower lying parts of the corrugation profile or of the surface roughness.

The transverse segment 1 defines a base part 10 and two pillar parts 11, whereof the base part 10 extends mainly in the axial direction of the drive belt 50 and whereof the pillar parts 11 extend mainly in the radial direction of the drive belt 50, each from a respective axial side of the base part 10. In its thickness direction, each transverse segments 1 extends between a front surface 3 and a rear surface 2 thereof that are both oriented, at least generally, in the circumference direction of the drive belt 50. An opening 5 is defined, centrally between the pillar parts 11 and the base part 10 of each transverse segment, wherein a circumference section of the ring stack 8 is accommodated. A radially outward facing part 13 of the circumference surface of the base part 10, forming the radially inner boundary of the central opening 5, supports the ring stack 8 from the radial inside, which surface part is denoted support surface 13 hereinafter. This support surface 13 is typically convexly curved for promoting a preferred, centred alignment of the ring stack 8 during operation, i.e. rotation of the drive belt 50 in the transmission 51.

Both, i.e. the left- and right-side pillar parts 11 of the transverse segment 1 as seen in the front elevation of FIG. 2 are provided with a hook portion 9, in axial direction hanging over the central opening 5. The hook portions 9, in particular bottom, i.e. radially inward facing surfaces 14 thereof, partly close off the central opening 5 also in radial outward direction. In the drive belt 50, the hook portions 9 of the transverse segments 1 overlap with the ring stack 8 in axial direction and thus prevent or at least hinder that these can separate from the ring stack 8 in radial inward direction.

In the row of transverse segments 1 of the drive belt 50, at least a part of a front main body surface 3 of the transverse segment 1 abuts against at least a part of the rear main body surface 2 of a respectively preceding transverse segment 1 in the said row, whereas at least a part of the rear main body surface 2 of the transverse segment 1 abuts against at least a part of the front main body surface 3 of a respectively succeeding transverse segment 1. The abutting transverse segments 1 are able to tilt relative to one another, while remaining in mutual contact at and through an axially extending and radially, convexly curved surface part 4 of the front surfaces 3 thereof, which surface part is denoted tilting edge 4 hereinafter. Below, i.e. radially inward of such tiling edge 4, the transverse segment is tapered, as can been seen in the side elevation thereof in FIG. 2, to allow for such mutual tilting without interference of the respective base parts 10 of the abutting transverse segments 1 below the tilting edge 4. It is noted that, although in FIG. 2 the tilting edge 4 is located in the base part 10 of the transverse segment 1, it is also known to at least partly locate it in the pillar parts 11, i.e. in two axially separate, but radially aligned, sections.

Figure 3:
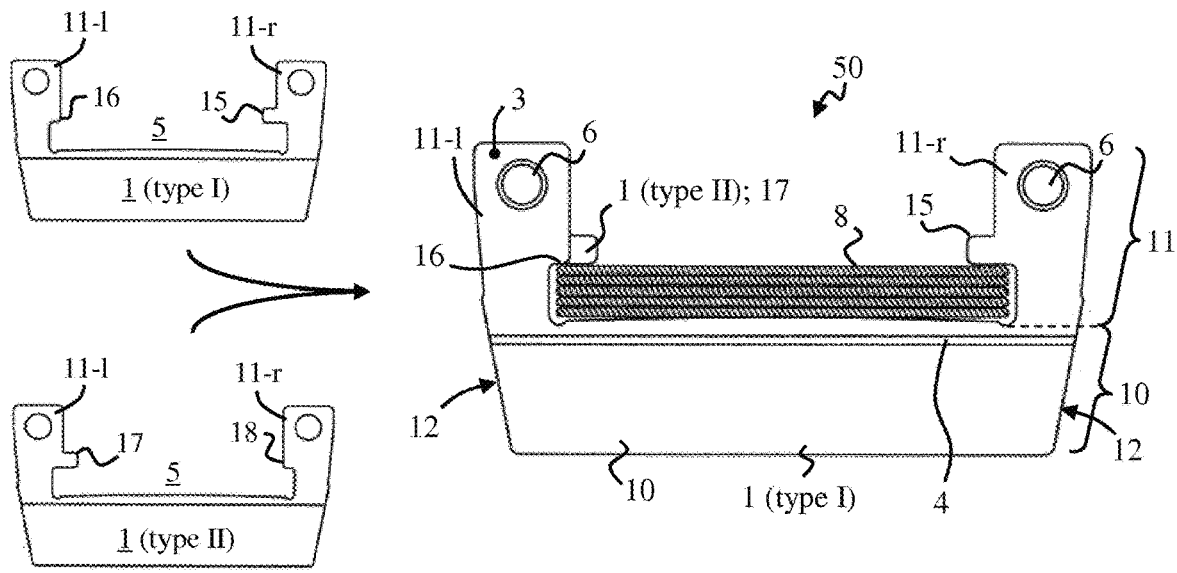
FIG. 3 provides a second example of the known drive belt in a cross-section thereof facing in its circumference direction.

As mentioned, the drive belt 50 of FIG. 2 is of a relatively early known design. In FIG. 3 a more recent, known design thereof is illustrated. Firstly, this latter known design of the drive belt 50 differs from the former one in that the two pillar parts 11 of the transverse segments 1 are each provided with a projection 6 that protrudes from the front surface 3 of the respective transverse segment 1 in, essentially, the said circumference direction. In the drive belt 50, the projections 6 of a transverse segment 1 are inserted in recesses (not shown) provided in the rear surface 2 of an adjacent transverse segment 1 to limit a relative movement between the adjacent transverse segments 1, at least in radial direction, but typically also in axial direction.

Furthermore, this latter known design of the drive belt 50 includes two types I, II of transverse segment 1, namely a first transverse segment type I whereof the hook portion 15 of one pillar part 11, i.e. the right-side pillar part 11-$r$ in FIG. 3, is considerably larger, i.e. extend further in axial direction, than the hook portion 16 of the opposite, i.e. left-side pillar part 11-$l$ and a second transverse segment type II whereof—to the contrary—the hook portion 17 of the left-side pillar part 11-$l$ is considerably larger than the hook portion 18 of the right-side pillar part 11-$r$. In the row of transverse segments 1 of the drive belt 50, these two transverse segment types I, II are arranged one after the other. This particular, asymmetric design of the transverse segments 1, which is, moreover, axially mirrored between the said two types I, II thereof, allows the individual transverse segments 1 to be mounted on the ring stack 8 with relative ease, because the smaller hook portion 16, resp. 18 thereof provides for a relatively wide entrance to the central opening 5 in axial direction. In the drive belt 50, the larger hook portions 15, 17 of the two types I, II of transverse segments 1 cooperate to reduce the width of the entrance to the central openings 5 thereof in axial direction and to contain the ring stack 8 therein.

According to the present disclosure, in both known drive belt designs, the combined axial extend of the hook portions 9, resp. 15 and 16, resp. 17 and 18 of the individual transverse segment 1 in relation to the width of the ring stack 8, i.e. the said overlap there between, is limited. In particular, such combined axial extend is limited by the requirement that it must be possible to insert the ring stack 8 into the central opening 5 of the transverse segment 1, essentially without deforming it. Thus, in these known designs it is a concern that, already at a relatively small axial displacement of the transverse segment 1 relative to the ring stack 8 in the said straight trajectory parts ST of the drive belt 50, it can rotate around an axial side of the ring stack 8, whereby the opposite axial side of the ring stack 8 would be released from the central opening 5. The present disclosure addresses such concern in a novel design for the transverse segment 1.

Figure 4:
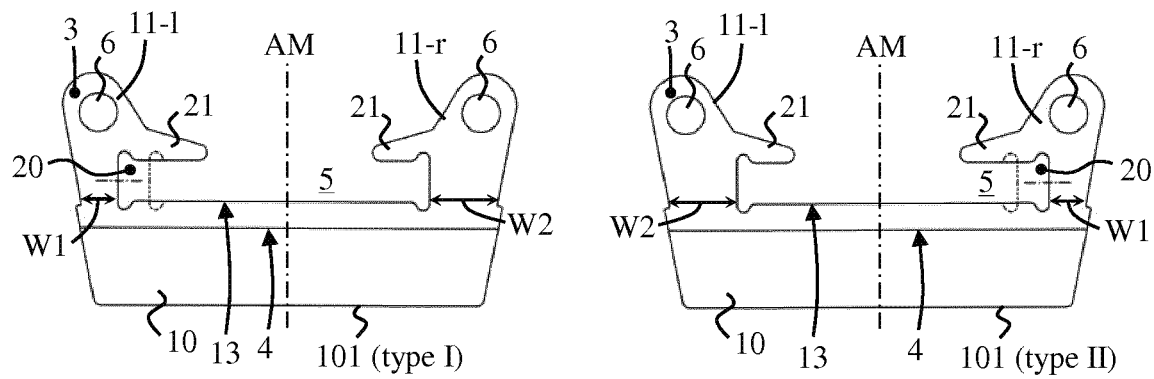
FIG. 4 provides a first embodiment of the novel transverse segment according to the present disclosure in two variants (i.e. two "types") thereof in a schematic front elevation.

FIG. 4 provides a schematic front elevation of the transverse segment 101 according to the present disclosure in a first embodiment thereof. In particular, two types I, II of the novel transverse segment 101 are provided, namely a first transverse segment type I whereof one pillar part 11, i.e. the left-side pillar part 11-$l$ in FIG. 4, is provided with an undercut 20, at least relative to the contour of the opposite, i.e. right-side pillar part 11-$r$ thereof, and a second transverse segment type II whereof only the right-side pillar part 11-$r$ is provided with such undercut 20. In either case, the undercut 20 extends from the central opening 5 of the transverse segment 101 in axial direction into the respective pillar part 11 thereof, such that locally an axial width W1 of that respective pillar part 11 with the undercut 20 is less than an axial width W2 of the respectively opposite pillar part 11 that is without such undercut 20, at least as measured axially in line with the support surface 13, i.e. at essentially the same radial position as the support surface 13, as indicated in FIG. 4. Also, in FIG. 4, the contour of the respective pillar part 11-$l$, 11-$r$ of the known transverse segment 1 is schematically indicated by the dotted line for comparison, i.e. to define the concept of the undercut 20 according to the present disclosure vis-à-vis the state of the art.

Preferably and as also illustrated in FIG. 4, the hook portions 21 of the respective pillar parts 11 of the novel transverse segment 101 extend in axial direction towards an axial middle AM thereof by substantially the same extent. Hereby, the novel transverse segment 101 is advantageously shaped predominantly axially symmetric, i.e. with the exception of the undercut 20 present in only one of the pillar parts 11-$l$, 11-$r$ thereof.

It is noted that the axial extent of the hook portions 21 shown in FIG. 4 is indicative only. In particular, the axial extent of the hook portions 21 relative to the width of the central opening 5 can be less than what is show in FIG. 4, to allow a wider ring stack 8 to be fitted in the opening 5. Hereby, the power transmitting capacity of the drive belt 50 is improved, however, at the expense of a reduced amount overlap between the hook portions 21 and the ring stack 8. According to the present disclosure, a practical optimum is found for the axial extent of the individual hook portion 21 of between 10% and 20%, more preferably of between 12.5% and 17.5%, or around 15% of the axial width of the central opening 5 excluding the undercut 20. Preferably also, the axial width W1 of the pillar part 11 with the undercut 20 amounts to between 0.5 and 0.8, more preferably between 0.6 and 0.7 times the axial width W2 of the opposite pillar part 11 of the novel transverse segment 101. According to the present disclosure, these particular relative dimensions provide an optimum balance between the resulting overlap between ring stack 8 and the hook portions 21 and the remaining strength of the pillar part 11 with the undercut 20.

Figure 5:
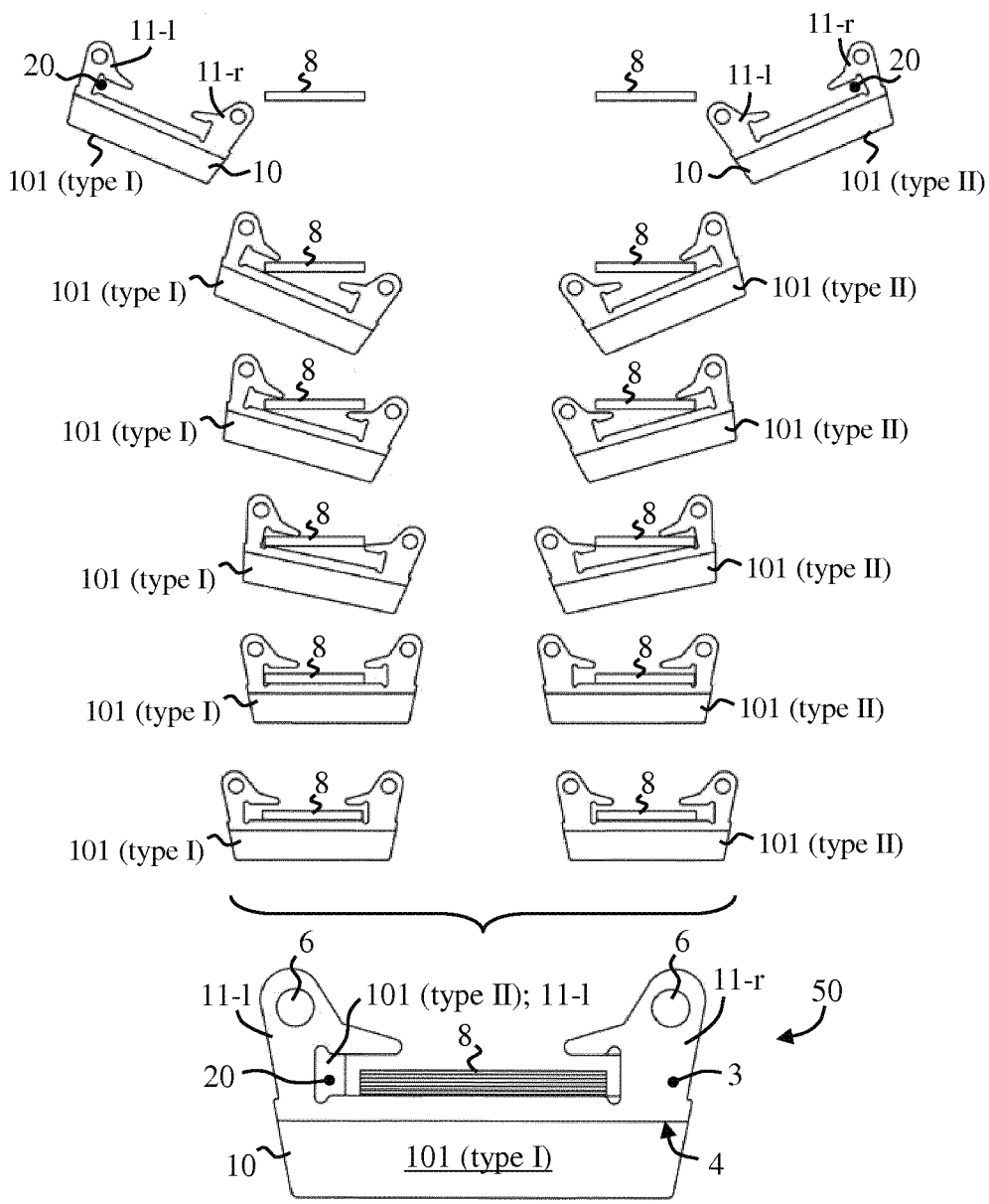
FIG. 5 schematically illustrates the drive belt assembled with the two types of the transverse segment shown in FIG. 4 and also includes a diagrammatic indication of the assembly process thereof.

In the drive belt 50 both types I, II of the novel transverse segment 101 are incorporated, as illustrated in FIG. 5. As seen in circumference direction of the drive belt 50, the pillar part 11; 11-$r$ without the undercut 20 of the first transverse segment type I coincides with the undercut 20 of the second transverse segment type II and vice versa. Hereby, an axial play of the ring stack 8 relative to the row of transverse segments 101 of the drive belt 50 is favourably determined by the respective pillar parts 11 without the undercut 20. Preferably, the said two transverse segment types I, II are incorporated in the drive belt 50 in mutual succession.

As schematically indicated in FIG. 5, the drive belt 50 is assembled from the novel transverse segments 101 by placing the transverse segments 101 of the first type I, whereof the left-side pillar parts 11-$l$ are provided with the undercut 20, to the left axial side of the ring stack 8 and by moving these to the right with respect to the ring stack 8 that is thereby inserted in the undercut 20 until the right axial side of the ring stack 8 clears the hook portion 21 of the right-side pillar part 11-$r$ of a respective transverse segment 101 of the first type I. Depending on the shape, i.e. outer contour of the novel transverse segment 101, such insertion of the ring stack 8 into the undercut 20 either can be accomplished by the linear, axial translation of the transverse segment 101 alone, or involves a translation in height direction and/or a rotation thereof as well. Thereafter, the respective transverse segment 101 is rotated into axial alignment with the ring stack 8 and is moved back to the left a little for centring it in axial direction with respect to the ring stack 8. The novel transverse segments 101 of the second type II are mounted on the ring stack 8 in a similar, however, axially mirrored way.

Figure 6:
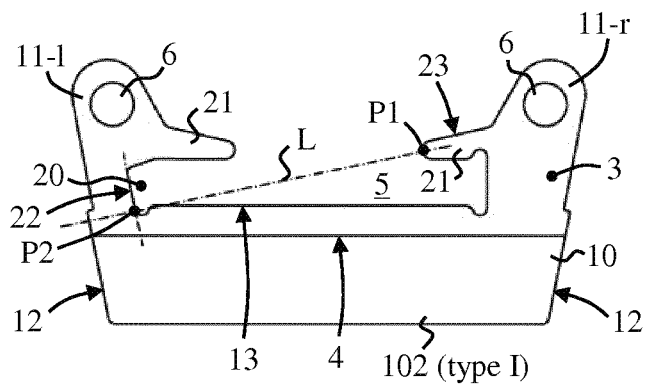
FIG. 6 provides a second embodiment of the novel transverse segment according to the present disclosure in a schematic front elevation thereof.

FIG. 6 provides a schematic front elevation of the transverse segment 102 according to the present disclosure in a second embodiment thereof. In this second embodiment, an axial boundary surface 22 of the undercut 20 is oriented essentially perpendicular relative to a straight, virtual line L drawn through:

a first point P1 on the outer contour of the hook portion 21 of the pillar part 11 without the undercut 20 that defines the entrance to the central opening 5 of the transverse segment 102 in axial direction; and a second point P2 defined by the radially innermost side of the axial boundary surface 22 of the undercut 20.

This virtual line L effectively represents a radially inner side of the ring stack 8 as it is inserted into the undercut 20 when the drive belt 50 is being assembled. By the axial boundary surface 22 extending perpendicular to such virtual line L, the undercut 20 is optimally dimensioned in axial direction to receive the ring stack 8 in the assembly process.

Preferably and as also illustrated in FIG. 6, the axial boundary surface 22 of the undercut 20 is oriented essentially in parallel with the pulley contact face 12 of the novel transverse segment 102 that is located closest thereto. Hereby, the pillar part 11 provided with the undercut 20 can favourably be shaped such that its axial width remains essentially the same along the radial height of the undercut 20. Additionally, the hook portion 21 of the opposite pillar part 11 without the undercut 20 is preferably shaped such that:

the virtual line L is oriented at an angle relative to the support surface 13 corresponding to an angle of the said pulley contact faces 12; and/or that a top surface 23 of the hook portion 21 of the opposite pillar part 11 without the undercut 20 is preferably oriented either essentially in parallel with the virtual line L or at a more shallow angle relative to the axial direction, at least in part.

Hereby, an adverse contact between the said pillar part 11 without the undercut 20, in particular the hook portion 21 thereof, and the ring stack 8 can be avoided in the assembly process of the drive belt 50.

It is noted that in FIG. 6 only one type, in particular type I of the novel transverse segment 102 is depicted with the undercut 20 being provided (only) in its left-side pillar part 11-l. However, within the context of the present disclosure, it is understood, that the drive belt 50 will also include novel transverse segments 102 of the second type II with the undercut 20 being provided (only) in its right-side pillar part 11-r (not shown).

Figure 7:
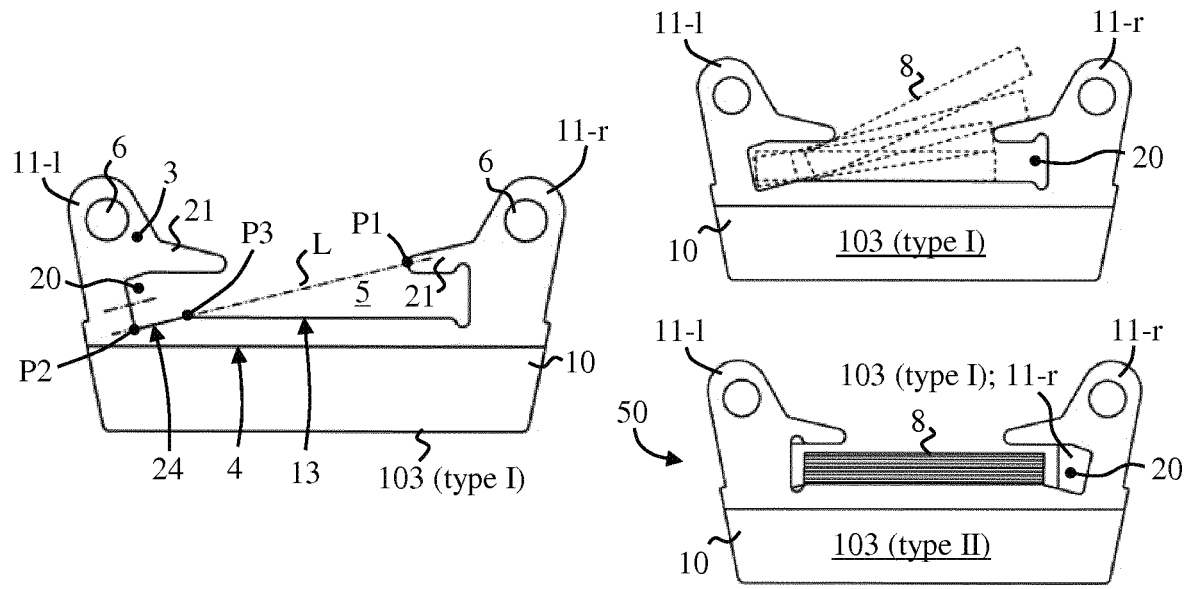
FIG. 7 provides a third embodiment of the novel transverse segment according to the present disclosure in a schematic front elevation thereof and also includes a diagrammatic indication of the assembly process thereof, as well as a schematic cross-section of the drive belt assembled with two types of transverse segments according to this third embodiment.

FIG. 7 provides a schematic front elevation of the transverse segment 103 according to the present disclosure in a third embodiment thereof. In this third embodiment a further, i.e. radial inward boundary surface 24 of the undercut 20 of the novel transverse segment 103 extends away from the support surface 13 not only in axial direction, but also in radial inward direction. Hereby, a relatively large angle of insertion of the ring stack 8 into the central opening 5 is enabled, such that a relatively thick ring stack 8 can be inserted through the entrance of the central opening 5 in between the hook portions 21, in particular in comparison with the otherwise identically shaped, second embodiment of the transverse segment 102 discussed hereinabove.

Preferably in this third embodiment of the novel transverse segment 103 and based on geometric considerations, the said virtual line L intersects a third point P3 defined by the intersection between the radial inward boundary surface 24 of the undercut 20 and the support surface 13 or a convexly curved transition surface (not shown) that may be provided there between.

Figure 8:
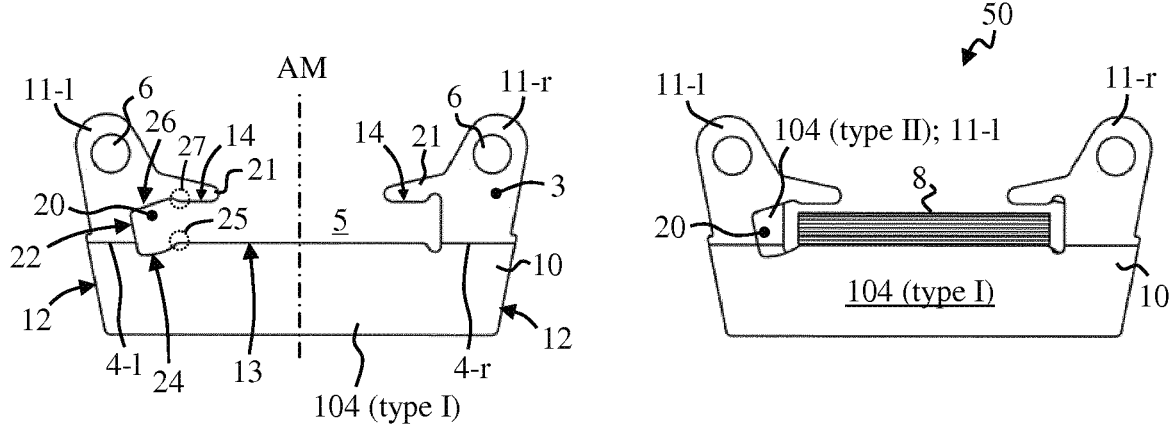
FIG. 8 provides a fourth embodiment of the novel transverse segment according to the present disclosure in a schematic front elevation thereof and also includes a schematic cross-section of the drive belt assembled with two types of transverse segments according to this fourth embodiment.

FIG. 8 provides a schematic front elevation of the transverse segment 104 according to the present disclosure in a fourth embodiment thereof. In this fourth embodiment of the novel transverse segment 104, the pulley contact surfaces 12 thereof extended from (the axial sides of the) base part 10 into (an axial side of) the pillar parts 10. Furthermore, the tilting edge 4 is located in the pillar parts 11, i.e. is provided in two sections 4-l, 4-r located in the respective left-side and right-side pillar parts 11-l, 11-r. In particular, the two sections 4-l, 4-r of the tilting edge 4 are located essentially axially in line with the support surface 13, i.e. at the essentially the same radial position as the support surface 13. These latter two design features are known as such and are known to improve the operating efficiency of the transmission 51 incorporating the drive belt 50 provided with these novel transverse segments 104. Also in this fourth embodiment of the novel transverse segment 104, the undercut 20 includes the following, preferred design features.

Firstly, a convexly curved transition surface 25 is provided between the radial inward boundary surface 24 of the undercut 20 and the axial side edge of the support surface 13. The radius of convex curvature of this transition surface 25 preferably corresponds to a radius of convex curvature of a further transition surface that is provided at the opposite axial side edge of the support surface 13 where the support surface 13 merges with an axially facing, side surface of the opposite pillar part 11 without the undercut 20. Preferably also, the transition surface 25 and the said further transition surface are provided axially symmetric relative to an axial middle AM of the novel transverse segment 104. By these latter design features of the novel transverse segment 104, the loading of the ring stack 8 during operation of the drive belt 50 will be more favourable, in particular more equally distributed between the axial sides thereof.

Secondly and to the same effect, a convexly curved surface part 27 of the novel transverse segment 104 is provided between a radial outward boundary surface 26 of the undercut 20 and the radially inward facing surface 14 of the respective hook portion 21. The radius of convex curvature of this particular surface part 27 preferably corresponds to a radius of convex curvature of yet a further transition surface that is provided where the radially inward facing surface 14 of the opposite hook portion 21 merges with the said axially facing, side surface of the opposite pillar part 11 without the undercut 20.

Thirdly, the radial inward boundary surface 24 of the undercut 20 is at least partly concavely curved, in particular such that a corner between that the radial inward boundary surface 24 and the axial boundary surface 22 of the undercut 20 is less than 90 degrees. Preferably, the said corner is curved at a radius of less than 0.5 mm, whereas the radius of concave curvature of the radial inward boundary surface 24 amounts to 1.5 mm or more. Even though by such concavely curved radial inward boundary surface 24, the undercut 20 extends further into the base part 10 of the transverse segment 104, an extent thereof in axial direction can be favourably reduced hereby, at least relative to a straight and flat radial inward boundary surface 24 coinciding with the virtual line L, as depicted in FIG. 7. This design feature thus favourably provides for a minimal decrease in the bending stiffness and/or mechanical strength of the respective pillar part 11 with the undercut 20 relative to the pillar part 11 without the undercut 20.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. A transverse segment (101; 102; 103; 104) for a drive belt (50) comprising:
    a stack (8) of rings that define a ring stack (8); and
    a number of transverse segments (101; 102; 103; 104) provided in a row along the circumference of the ring stack (8),
    wherein each transverse segment (101; 102; 103; 104) comprises a base part (10) and two pillar parts (11) that respectively extend from a respective axial side of the base part (10) in radial outward direction, defining a central opening (5) of the transverse segment (101; 102; 103; 104) between them, and
    wherein the central opening (5) is bounded in a radial inward direction by a radially outwardly facing support surface (13) of the base part (10), at least predominantly axially extending continuously over a predominant part of the central opening (5) between the pillar parts (11), the pillar parts (11) being provided with a hook portion (21) extending over a part of the central opening (5) in the general direction of the respectively opposite pillar part (11),
    wherein, a width dimension (W1) of one of the pillar parts (11) of the transverse segment (101; 102; 103; 104) defined in an axial direction at any radial level between the support surface (13) and a radially inner bottom surface (14) of the hook portions (21) is less than a width dimension (W2) of the other one, i.e. axially opposite pillar part (11) thereof at such radial level.

2. The transverse segment (101; 102; 103; 104) according to claim 1, wherein the width dimension (W1) of the said one pillar part (11) amounts to between 0.5 and 0.8 times the width dimension (W2) of the said other one pillar part (11).

3. The transverse segment (101; 102; 103; 104) according to claim 1, wherein the said one pillar part (11) is provided with an undercut (20) in axial direction relative to the said other one pillar part (11), which undercut (20) merges with the central opening (5).

4. The transverse segment (101; 102; 103; 104) according to claim 3, wherein, with the exception of the undercut (20) provided in the said one pillar part (11), the pillar parts (11) are shaped mirror symmetrically with respect to an axial middle (AM) of the transverse segment (101; 102; 103; 104), in particular of the base part (10) thereof.

5. The transverse segment (101; 102; 103; 104) according to claim 3, wherein at least a predominant part of an axial boundary surface (22) of the undercut (20) is oriented essentially parallel to the respective axial side of the base part (10).

6. The transverse segment (101; 102; 103; 104) according to claim 3, wherein at least a predominant part of an axial boundary surface (22) of the undercut (20) is oriented essentially perpendicular to a virtual straight line (L) drawn through both:
    a first point (P1) on the outer contour of the hook portion (21) of the said other one pillar part (11) without the undercut (20) defining axial extent of an entrance to the central opening (5) towards that other one pillar part (11); and
    a second point (P2) defined by a radially innermost side of the axial boundary surface (22) of the undercut (20).

7. The transverse segment (101; 102; 103; 104) according to claim 3, wherein at least a predominant part of a radially inner, i.e. bottom surface (24) of the undercut (20) is oriented in radial inward direction towards the respective axial side of the base part (10).

8. The transverse segment (101; 102; 103; 104) according to claim 3, wherein the bottom surface (24) of the undercut (20) predominantly coincides with or lies radially inward of a virtual straight line (L) drawn through both:
    a first point (P1) on the outer contour of the hook portion (21) of the said other one pillar part (11) without the undercut (20) defining axial extent of an entrance to the central opening (5) towards that other one pillar part (11); and
    a second point (P2) defined by a radially innermost side of the axial boundary surface (22) of the undercut (20).

9. The transverse segment (101; 102; 103; 104) according to claim 7, wherein at least a predominant part of the bottom surface (24) of the undercut (20) is concavely curved.

10. The transverse segment (101; 102; 103; 104) according to claim 3, wherein at least a part of a radially outer, i.e. top surface (23) of the hook portion (21) of the said other one pillar part (11) without the undercut (20) is oriented either essentially in parallel with a virtual line (L) drawn through both:
    a first point (P1) on the outer contour of the said hook portion (21) of the other one pillar part (11) without the undercut (20) defining axial extent of an entrance to the central opening (5) towards that other one pillar part (11); and
    a second point (P2) defined by a radially innermost side of the axial boundary surface (22) of the undercut (20), or is oriented at a more shallow angle than such virtual straight line (L) relative to the axial direction.

11. Drive belt (50) for a continuously variable transmission (51) comprising the ring stack (8) and the transverse segments (101; 102; 103; 104) according to claim 1, which transverse segments (101; 102; 103; 104) are arranged in a row along the circumference of the ring stack (8) that is located in the central openings (5) thereof, wherein the drive belt (50) includes two types (I, II) of the transverse segments (101; 102; 103; 104) that are mutually different by the said one pillar part (11) of lesser width relative to the said other one pillar part (11) being provided on opposite axial sides of the base part (10) of the respective transverse segments (101; 102; 103; 104) as seen in a circumference direction of the drive belt (50).

12. The drive belt (50) according to claim 11, wherein the two types (I, II) of transverse segments (101; 102; 103; 104) are alternatingly included in the said row of transverse segments (101; 102; 103; 104).

13. The drive belt (50) according to claim 11, wherein the hook portions (21) of the pillar parts (11) of the transverse segments (101; 102; 103; 104) define the entrance to the central opening (5) of the respective transverse segment (101; 102; 103; 104) axially symmetric relative to an axial middle (AM) of the base part (10) thereof.

14. The drive belt (50) according to claim 11, wherein the hook portion (21) of the said other one pillar part (11) of the transverse segments (101; 102; 103; 104) extends over the central opening (5) for around 10% to 20% of an axial width of that central opening (5) without the undercut (20).

15. Continuously variable transmission (51) with two pulleys (52, 53) and the drive belt (50) according to claim 12.

16. The transverse segment (101; 102; 103; 104) according to claim 1, wherein the width dimension (W1) of the said one pillar part (11) amounts to between 0.6 and 0.7 times the width dimension (W2) of the said other one pillar part (11).

17. The drive belt (50) according to claim 11, wherein the hook portion (21) of the said other one pillar part (11) of the transverse segments (101; 102; 103; 104) extends over the central opening (5) for around 12.5% and 17.5% of an axial width of that central opening (5) without the undercut (20).

\* \* \* \* \*